(12) United States Patent
Klapper et al.

(10) Patent No.: US 11,720,462 B2
(45) Date of Patent: Aug. 8, 2023

(54) PHYSICAL EXECUTION MONITOR

(71) Applicant: Continental Teves AG & Co. OHG, Frankfurt am Main (DE)

(72) Inventors: Patrick Thomas Michael Klapper, Schwalbach a. Ts. (DE); Marc Sebastian Patric Stöttinger, Schwalbach a. Ts. (DE); Miguel Hernandez, Schwalbach a. Ts. (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 406 days.

(21) Appl. No.: 16/941,723

(22) Filed: Jul. 29, 2020

(65) Prior Publication Data
US 2021/0034489 A1    Feb. 4, 2021

(30) Foreign Application Priority Data
Jul. 30, 2019   (EP) ..................................... 19189184

(51) Int. Cl.
*G06F 11/00* (2006.01)
*G06F 11/30* (2006.01)
(Continued)

(52) U.S. Cl.
CPC .......... *G06F 11/3024* (2013.01); *G06F 17/16* (2013.01); *G06F 18/24* (2023.01); *G06F 21/57* (2013.01)

(58) Field of Classification Search
CPC ............. G06F 11/3024; G06F 11/3013; G06F 11/302; G06F 11/3065; G06F 11/3072;
(Continued)

(56) References Cited

U.S. PATENT DOCUMENTS 10,063,582 B1   8/2018   Feng et al.
10,872,149 B1 *  12/2020  Alexander ............ G06F 21/567
(Continued)

FOREIGN PATENT DOCUMENTS

CN      107851047      3/2018
WO   WO 2014/149080   9/2014

OTHER PUBLICATIONS

Office Action dated Jan. 9, 2023 issued in European Patent Application No. 19189184.5.
(Continued)

*Primary Examiner* — Joseph D Manoskey
(74) *Attorney, Agent, or Firm* — Cozen O'Connor

(57) ABSTRACT

A method of monitoring execution of computer instructions includes receiving data items representing real-time measurements of side-channel information emanating from execution of computer instructions, each data item forming a value of a corresponding dimension of a side-channel information vector, receiving, for two or more of the dimensions of the side-channel vector, classifiers that assign the corresponding values of a side-channel vector to classes, and classifying the data items in accordance with the received classifiers, wherein an orthogonal distance of the data item from the classifier indicates a confidence value of the classification, generating a combined a confidence value for the side-channel information vector a, and outputting a signal if a confidence value indicates affiliation to a selected one of the two classes with a predetermined probability. The method conducts a self-test by generating a combined confidence value based to ensure correct outputting of the confidence value.

13 Claims, 3 Drawing Sheets

(51) Int. Cl.
*G06F 17/16* (2006.01)
*G06F 18/24* (2023.01)
*G06F 21/57* (2013.01)

(58) Field of Classification Search
CPC ...... G06F 11/3612; G06F 17/16; G06F 21/55; G06F 21/57; G06F 2221/033; G06F 18/24; G06K 9/6267
See application file for complete search history.

(56) References Cited

U.S. PATENT DOCUMENTS

| | | |
|---|---|---|
| 2013/0318607 A1 | 11/2013 | Reed et al. |
| 2015/0317475 A1 | 11/2015 | Aguayo Gonzalez et al. |
| 2015/0373036 A1* | 12/2015 | Patne .................... G06F 21/556 726/23 |
| 2016/0337390 A1 | 11/2016 | Sridhara et al. |
| 2018/0082201 A1 | 3/2018 | Cantwell |
| 2019/0147162 A1* | 5/2019 | Mejbah Ul Alam .. G06N 3/088 726/23 |

OTHER PUBLICATIONS

Search Report dated Jan. 20, 2022 issued in European Patent Application No. 19189184.5.

\* cited by examiner

PHYSICAL EXECUTION MONITOR

BACKGROUND OF INVENTION

1. Field of the Invention

The present disclosure relates to methods and devices for monitoring and ensuring integrity of software-controlled digital systems. In particular, the present disclosure relates to monitoring and ensuring integrity of security-related functions of such digital systems.

2. Description of Related Art

Many of today's devices and apparatuses are controlled by some form of software or firmware that is executed by a processor to provide specific functions or services. Some of those functions or services may be particularly relevant for a proper operation of the devices. These functions may be protected, e.g. through security controls that are active whenever such function is initiated, used, invoked, accessed etc., or when a digital device implementing such function is booted. Security functions that may require such protection include functions that perform or implement access control, authentication, authorization, encryption and decryption, establishing and terminating secure connections, verification and integrity checks of software or data, and the like.

All of these security functions have in common that they are provided for ensuring and maintaining integrity of the function of a device or apparatus, e.g., of the software executed in the device or apparatus that implements such function, or the integrity of data processed in such device or apparatus, for ensuring and maintaining confidentiality of data stored or processed in such device or apparatus, for ensuring and maintaining availability of such device or apparatus or of the functions provided by it, and also for providing and securing forensic evidence that facilitate non-repudiation of actions or services and the like that were taken or provided by such device or apparatus.

The security functions currently implemented in digital systems have in common that they usually output a binary result, i.e., a positive or negative statement regarding their function, e.g., positive or negative authentication, authorization, encryption or decryption, verification or integrity check, which is then taken at face value and may be used for further operation.

However, the inner workings of the security functions, which may be represented by a sequence of computer program instructions that follow one or more of a limited number of legitimate and valid control flows, are not visible to the user or system that receives the result, and it cannot be guaranteed that the security function itself is not compromised. There may, in fact, not even be a guarantee that the function was actually executed, and the "result" was not simply "injected" into output signal, replacing the original output signal. If security is taken seriously it must thus be assumed that it is unknown if the result has been generated by the original and genuine security function or if the provided result has been manipulated or faked by an attacker or has been generated by a compromised system or process.

Some digital systems provide elements for monitoring the integrity of the flow of instructions and data of a computer program by specific ways of programming a software function and simultaneous execution of corresponding software modules provided for checking the control flow integrity (CFI). CFI is a general term for computer security techniques which prevent a wide variety of malware attacks from redirecting the flow of execution of a computer program. Associated techniques include, inter alia, code-pointer separation (CPS), code-pointer integrity (CPI), stack canaries, shadow stacks, and vtable pointer verification. Present implementations of CFI usually check the control flow of a process or program based on previously given valid reference control flow sequences or sequence patterns.

All of these known ways of monitoring CFI have in common that they need read access to registers or data provided through the monitored computer program itself, either through corresponding software instructions or through the design of the hardware that implements the function. This, in turn, means that, if a function was not programmed in accordance with CFI requirements, or the hardware was not designed with CFI in mind, it needs to be adapted.

Modifying the software running on existing hardware systems for implementing CFI may be impossible, e.g., due to already tight processing power or memory constraints. Modifying the software may also be undesirable because a device or apparatus that implements the security function may have to undergo a regulatory assessment or other kind of approval, which may be costly and be subject to updated requirements that cannot be met by the existing hardware. For the same reason modifying the hardware is often undesired.

Further, due to the tight link between a function whose integrity is monitored by CFI in accordance with existing implementations and the reference sequences or patterns any modification to the monitored function requires accordingly updating the reference sequences or patterns. A change during runtime, e.g., by adding a further pattern for an additional valid control flow or removing a pattern that no longer is considered a valid control flow is not possible or only possible at high cost and effort.

Moreover, when an attacker is aware of control flow monitoring in a device or system the CFI checking hardware or software may itself be targeted by attackers, who may compromise the CFI checking hardware or software in many ways, or trick the CFI function into believing an injected fake result is valid. For example, one way of tricking the CFI checking software includes injecting the fake result only after the legit security function has executed a valid sequence of steps. This attack may use a weakness of some CFI implementations that do not verify further processing of a result in accordance with a corresponding instruction sequence, but merely the execution of any valid instruction sequence.

The increasing complexity of software-implemented functions and features to be monitored lead to a corresponding increase of the computing resources, hardware and software, required for CFI monitoring and may further add to the complexity of the monitored software. Some existing concepts for monitoring CFI thus try to avoid implementing actual software instruction-level CFI monitoring by providing two or more identical systems and comparing their output results and possibly intermediate signals that are characteristic for the system's operation. Upon detecting different results or behaviour tampering is inferred and reported. However, this approach itself is also quite heavy on the use of resources.

Yet further, the existing solutions inform the user about a detected anomaly or output a corresponding signal based on a binary decision. In general, binary decisions may be prone to false positives because of a fixed threshold selection, while false negatives typically go unnoticed. To reduce the occurrence of false positives, even more so for preventing them, massive pre-processing and measurements are required, the implementation of which may not be feasible in resource constrained systems.

Also, the existing systems provide no means of checking the integrity of the hardware and/or software used for monitoring the CFI, or the validity of the input signals and parameters, and their sources of origin, used in the monitoring process.

SUMMARY OF THE INVENTION

It is, therefore, desirable to provide methods and implementations for improved CFI monitoring and integrity checking that address one or more of the above-mentioned shortcomings of existing solutions.

A computer-implemented method of monitoring execution of computer program instructions in a microprocessor of a digital system in accordance with a first aspect of the present disclosure includes receiving a plurality of data items representing real-time measurements of side-channel information emanating from and/or correlated to execution of computer program instructions in the monitored digital system. Each one of the plurality of data items forms a value of a corresponding dimension of a side-channel information vector. The data items of one side-channel information vector are sampled in a close timed relationship or correlation with each other, including a simultaneous sampling or a sampling within in a predetermined time window. Samples making up side-channel information vectors may be taken at a fixed sample rate or in accordance with trigger signals present upon specific conditions.

In the context of one aspect of this disclosure side-channel information may include one or more of different physical properties of the monitored digital system including, e.g., electromagnetic radiation, heat radiation, varying currents and voltages on its power supply lines, light emission of control or indicator lights, acoustic emission of loudspeakers, buzzers, solenoid actuators, vibrators, and the like. Side-channel analysis may also exploit signals present on data lines that provide data to the microprocessor, and signals output by the microprocessor. This may be used, e.g., for distinguishing memory or register access expected during a normal flow of operations from unexpected access to registers or memory. The physical properties may be sensed by sensors that are already included in the monitored system, e.g., by reading out a power management component that provides current or voltage information, or by reading out a system clock generator that provides a processor load-dependent system clock frequency. Other internal sensors may include temperature sensors that are provided for reducing the clock frequency of a processor in the event of exceeding a temperature threshold, or the like. However, the physical properties may also be sensed by sensors additionally provided in the system for the purpose of monitoring the control flow. Other information that is not strictly side-channel information, e.g., a current date, time, environmental conditions, etc., may also be used for identifying an unusual behaviour of the system.

The computer-implemented method according to the one aspect further includes receiving, for two or more of the dimensions of the side-channel vector, classifiers that assign a received side-channel information vector to one of two classes. As many classifiers may be received as there are dimensions in the side-channel information vector. While a classifier may have a base in one dimension, the entire vector will be assigned to one of two classes based on the classifier. The classes may for example represent normal or abnormal control flow, intact or compromised system integrity, or the like.

Each classifier may include a definition of a hyperplane that unambiguously and linearly separates, in a classification space, samples of a training set of side-channel information vectors, or transformed representations thereof, into one of the two classes. Each hyperplane is placed equidistantly between those two samples of its associated dimension of a side-channel information vector that are belonging to different classes and that have the smallest distance from each other in the classification space amongst all possible sample pairs. Each one of the plurality of hyperplanes is, by definition, orthogonal to the other hyperplanes for other dimensions of the side-channel information vector. Depending on the correlation of the values of different dimensions of a side-channel information vector the vector may need to be transformed into classification space of a much higher dimensionality for finding a hyperplane that clearly and linearly separates all constituents of the side-channel vector into one of the two classes.

Receiving the classifiers may include retrieving classifiers from a memory provided in or connected with the physical entity that implements the method, or from a separate entity that is communicatively connected thereto. The memory in or connected with the physical entity is preferably protected by additional security measures, e.g., authentication and authorization. The separate entity may be part of the same system that includes the physical entity that implements the method, or may be a remote entity, e.g. a remote database.

Separate sets of classifiers may be provided for a variety of different operations or time instants within a flow of operations. The classifiers may be received in a just-in-time manner in accordance with the appropriate operation that is expected at a certain instant within the control flow, e.g., expected as a next operation depending on a preceding operation. Accordingly, individual sets of classifiers may be provided, for example, for monitoring if an input to a security control from a memory is correct, e.g., received from the correct source, if the security control is successfully started, if branches within a flow of operations occur at the right points in the flow, i.e., if the function adheres to a valid and uninterrupted flow of operations, if the execution time of operations corresponds to a typical execution time, if the result of the security function has actually been obtained from the security function and is properly stored in the correct memory space and in a proper manner, if the security function is properly terminated and has not been paused or interrupted, etc.

The computer-implemented method according to the one aspect includes classifying the received side-channel information vector in accordance with each of the respective received classifiers. An orthogonal distance of the side channel information vector from the corresponding classifier indicates a probability or confidence value of the classification. Subjecting the side-channel information vector to multiple classifiers, each of which having a base in a different dimension of the vector, but each of which assigning the vector into one of the two classes with a possibly different probability or confidence, provides a more comprehensive view on the operating state of the monitored system than using a single simple comparison that produces a binary output result, and may reduce the influence of outliers on the result.

The computer-implemented method according to the first aspect further includes generating a combined probability or confidence value for the side-channel information vector based on the individual classifications and associated probability or confidence values.

Generating a combined probability or confidence value for the side-channel information vector may include, in one or more embodiments, averaging the individual classifications in a weighted manner that takes the respective probability or confidence value into consideration. Alternatively, individual ones of the classifiers may be assigned an additional weight that depends on their general reliability, significance or informative value.

The computer-implemented method according to the one aspect includes outputting a signal if a combined probability or confidence value of a side-channel information vector indicates affiliation to a selected one of the two classes with a predetermined probability. This may include outputting such a signal only if the probability or confidence values of a predetermined number of consecutive side-channel information vectors indicates such affiliation. The consecutive side-channel information vectors may be sampled at fixed or varying time distances. Typically, the signal will be output if the classification result indicates abnormal control flow or compromised system integrity, but it is also possible that a signal indicating normal control flow or intact system integrity is required at certain intervals for the system to continue operation.

In other words, providing a plurality of hyperplanes, each one based on a different dimension of the side-channel information vector, and classifying the entire side-channel information vector using each of the plurality of hyperplanes produces a corresponding number of classifications, each one from a different perspective in the classification space. Each classification from one of the different perspectives may have a probability for correct classification that is different from that of the classifications from other perspectives. Also, each one of the classifications may produce results having a higher or a lower significance or informative value. The various classifications from different perspectives and their respective probabilities may be assigned additional weights for the combination into one probability for the side-channel information vector. The weights may also be adapted, e.g., in response to the distribution of the individual value of the side-channel information vector corresponding to the base dimension of the respective classifier, to improve the overall probability of the classification. If, for example, values of the base dimension, i.e., the dimension upon which the classifier is determined, of the side-channel information vector can assume a range from 1 to 100, but this dimension is only relevant when the values are in a range from 75 to 100, this may be used for adjusting the additional weight accordingly. The weight may be adjusted individually for each side-channel information vector, according to its value for the base dimension, and each classifier may be assigned a different weight.

Generally, performing multiple classifications for each side-channel information vector, based on different classifiers, assigning probabilities for the correctness of the classifications, and merging the results into a combined classification and probability produces a more reliable result and is less likely to produce false positives.

In accordance with an embodiment of the computer-implemented method the monitoring is executed conditional upon receiving a corresponding trigger signal and/or upon the digital system executing one of a selected number of predetermined functions.

In one or more embodiments the trigger signal may be provided by the monitored entity or by an external entity, e.g. upon activation thereof or invocation thereof in a software-controlled process of the monitored entity. An example for an activation of an external entity that may cause the issuing of the trigger signal is the activation of a fingerprint sensor for authentication of a user. An example for invocation of an external entity is the establishing of a data communication with a data source external to the monitored entity through a communication channel, e.g., a network. Such external data sources, which may be active at any time for other purposes, include databases, sensors, other entities in the same digital system, etc. Invocation of an external entity may thus include read access to that entity, e.g., to a secure part of a memory of the digital system for reading an encryption key or other sensitive information, which may be identified by a signal issued from the memory or simply by monitoring an address range of a memory interface. Invocation may be understood as receiving something from the external entity or transmitting something to it.

In one or more embodiments the trigger signal may also be generated by a monitoring entity that periodically or continuously monitors side-channel information vectors of a lower dimensionality, i.e. having fewer dimensions and thus representing fewer side-channel information sources. This may also serve for the identification of the digital system executing one or more of a selected number of predetermined functions. Generally, the monitoring process may be activated selectively for security-related functions, while remaining inactive or having reduced activity at other times.

In one or more embodiments the classifiers may be adjusted or updated using side-channel information vectors classified in a learning phase of the digital system, in which the system is subjected to a plurality of defined operations and corresponding control flows each falling into one of two classes. Additionally, or alternatively updating may include using side-channel information vectors classified, during operating the system, as indicating an abnormal control flow or compromised system integrity, but which are re-classified as normal control flow or intact system integrity through subsequent additional system and/or user input. To this end side-channel information vectors may be stored for a predetermined time period, e.g., in a ring buffer. Storing side-channel information vectors may be limited to storing selected ones, advantageously those that are classified as indicating abnormal control flow or compromised system integrity.

Adjusting or updating may also include downloading new classifiers from an external source. This may be initiated in case the number of false positives that are later re-classified exceeds a predetermined value.

Generally, adjusting or updating may be necessary to reflect ageing of components, which may result in changed values in the side-channel information vector.

In accordance with one or more embodiments of the computer-implemented method a self-test phase for the monitoring entity and/or its software is provided, which may be entered upon starting the digital system, waking the system from a sleep state, or the like. The self-test may also be triggered by a signal received from an external source, e.g., a central management system or server that manages a plurality of digital systems, or by a local event, e.g., upon connection of a system diagnosis apparatus via a diagnostic port, or upon receiving a corresponding signal from such apparatus. It is, however, possible to simply perform the self-test periodically in accordance with a predetermined time interval.

The self-test may include a test of a function and/or the signal sources that are used in creating the data items forming the side-channel information vector, and may provide an information if the signal sources provide reliable data. If, for example, a signal source includes a current or voltage sensor, or a binary status indicator, it may be possible to determine if the sensor or indicator is functional, e.g., provides varying, non-random output values, by causing currents, voltages or a status to change in a defined way, and verifying if the sensor or indicator reading follows accordingly. Changing a current, voltage or status in a defined way may be achieved by performing corresponding operations known to cause those changes, and monitoring the side-channel information in accordance with the present method. Repeatedly performing the same function with static input data should result in identical sensor readings, while doing so with random input data should at least in some instants result in different sensor readings. If a sensor invariably provides the same readings, i.e., the sensor is "stuck", either the sensor, the software reading out the sensor, or the signal connection is defective. A similar principle can be used for testing functions or operations associated therewith.

Thus, in one or more embodiments the self-test includes executing a first arbitrarily selected function multiple times using static input data, generating corresponding side-channel information vectors and classifying them in accordance with the present method. The self-test further includes executing a number of other arbitrarily functions using static input data, generating corresponding side-channel information vectors and classifying them in accordance with the present method, and executing the first arbitrarily selected function again, but with random input data, generating corresponding side-channel information vectors and classifying them in accordance with the present method. The classifications of the various executions of functions, together with their associated probability or confidence values, are used for generating a probabilistic result as to whether or not the signal source, e.g., a sensor, is compromised. To this end the results of the classifications of the various executions of functions may be compared and/or provided as input data to a statistical hypothesis test, e.g., a Student's t-test, or to a test considering the probability distribution of the sample with regard to a reference probability distribution, e.g., a Kolmogorov-Smirnov test, for determining a status of the signal source or of the function, e.g., whether or not the signal source or the function provides reliable and true data.

In other words, the self-test first generates a reference fingerprint of physical properties of the system while performing a selected function, preferably under the controlled condition of an uncompromised system or function and input data. This may be translated into a template of the physical properties of the uncompromised system or parts thereof when executing the function. The side-channel information fingerprint generated for other functions using the same static data inter alia serve for pinpointing differences between operations of functions, while eliminating data-related differences that may occur, e.g., when data is read from other memory areas, or data of different types, like integer and float, causes different parts of a processor to be active, which would certainly result in a different power consumption and electromagnetic pattern. Performing the selected function using random data produces typical data-dependent fingerprint for the operations of the selected function, which may be used for identifying manipulated input data, as well as data-dependent changes in the flow of operations. The various fingerprints may be analysed using stochastic models and/or machine learning tools, for producing characteristic fingerprints of operations of the selected function and ultimately generating a template. The template may than be used for generating the classifier used for monitoring the side-channel information in real-time.

Any of the arbitrarily selected functions and/or the input data preferably produces data for all the dimensions of the side-channel information vector, and likewise preferably produces distinguishable data. Knowledge of the inner workings of the system's components may help selecting proper functions and input data for the self-test.

A signal representing the result of the self-test may be output to other system components and may be used for limiting functionality of the system based on a reasonable assumption that one or more of the system constituents may be compromised or defective. Limiting the functionality may include denying access to certain parts of the system or inhibiting operation of certain functions. The signal representing the result of the self-test may also be output to a user, and may further be transmitted to an entity external to the system, e.g., a database or the like. An identifier unambiguously identifying the system that is likely to be compromised or having defective components may be transmitted alongside with the result of the self-test. The entity external to the system may flag the system accordingly, and may provide corresponding information to other systems, which may use the information for restricting communication or interoperation with the presumed compromised or defective system.

The method may be implemented or executed in a microprocessor of the system that is provided exclusively for this purpose. However, it is also possible to perform the method steps on a separate core of a microprocessor, whose other cores run software for providing other functions of the system, including the monitored security function. It is even possible to perform the method in a separate threat on the same core that executes software for providing other functions in the system. On the other hand, it is possible to perform the method on a separate device that is otherwise not part of or involved in providing functions of the digital system, which may facilitate temporarily associating monitoring apparatus to a system in case of suspected compromised integrity. The classification in accordance with multiple dimensions suggested in the present method may provide results having the same accuracy as a monitoring entity that is integrated in the digital system.

The present method and apparatus or system provides elements for monitoring control flow integrity of digital systems and apparatuses that identifies anomalies by analysing the physical behaviour of the monitored system, in particular by non-intrusively obtained data representing the physical behaviour. The method is preferably selectively executed when security-related functions are performed by the monitored digital systems and apparatuses.

Analysing the physical behaviour or traces, or, more generally, side-channel information, dispenses with the need to modify the software or hardware of the supervised entity that provides the function, such that it provides input data that is used in conventional control flow monitoring. Modifications in the monitored software or hardware can be reflected by accordingly updating the classifiers in the monitoring entity. Updating the classifiers may include a training phase for identifying new fingerprints for various legit flows of operations, and deriving the classifiers therefrom.

Analysing a plurality of different physical properties significantly may improve the accuracy and reliability of the monitoring result.

The present method allows for monitoring and identifying if an operation of a security control has been started as intended, if the operation of the security control has been completed as intended, if operations of a security control have been executed in a proper order, and if the result that is used in other processes was actually provided by the— properly executed—security function, and was not injected or manipulated by an attacker.

Aspects of the present method allow for a self-testing of the entity or software implementing the monitoring function, which, inter alia, prevents using corrupted input data that may lead to false positives.

Assessing each set of system status data from a plurality of different perspectives and merging the individual results into a probabilistic combined result provides a more robust information to a user or to systems that use the output of the monitored function, system or apparatus.

Selectively performing the present method whenever security-relevant functions are executed may provide more accurate results, as more focused reference pattern or classifiers may be used, which may on the other hand be better tuned to the limited task. Likewise, selectively performing the present method reduces the monitoring and analysing overhead, and reduces the additional load on the system resources.

The present method and implementation may advantageously be used in the automotive domain, i.e., in vehicles, which may already be provided with hardware security modules or secure hardware extensions in their digital systems. Adapting the existing security hardware and software of vehicles to implement the present method or adding a further hardware or software that implements the present method may significantly increase security of the overall system. However, it is also possible to use the present method and implementations thereof for monitoring the correct behaviour and secure operation of embedded systems, IoT systems, etc., in other domains, for example, mobile phones, medical devices, and aircrafts.

Generally, the present method may be advantageously used for monitoring security controls, such as secure boot, debug interface protection, and diagnostic port protection, for protecting these functions against even very sophisticated attacks, such as fault injection attacks, or the like.

It is understood that one or more of the aforementioned aspects of the invention may be combined as long as the combined embodiments are not mutually exclusive.

As will be appreciated by one skilled in the art, aspects of the present invention may be embodied as an apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable mediums may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++, or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

In the following the computer-implemented method and according digital system will be described with reference to the attached drawings, in which FIG. 1 schematically illustrates a computer-implemented method of monitoring execution of computer program instructions in a microprocessor of a digital system in accordance with the present disclosure.

In the figures identical or similar elements are referenced by the same reference signs or designators.

DETAILED DESCRIPTION OF THE PRESENTLY PREFERRED EMBODIMENTS

Figure 1:
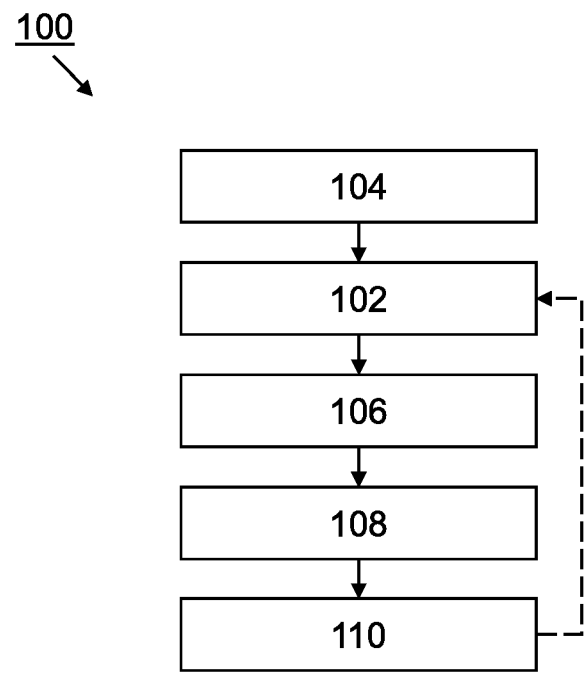

FIG. 1 schematically illustrates an exemplary embodiment of a computer-implemented method 100 of monitoring execution of computer program instructions in a microprocessor of a digital system in accordance with one aspect of the present disclosure. In step 102 a set including a plurality of data items representing real-time measurements of side-channel information emanating from and correlated to the execution of computer program instructions in a microprocessor of the monitored digital system is received. The plurality of data items may represent different physical properties of the monitored digital system including, e.g., electromagnetic radiation, heat radiation, varying currents and voltages on its power supply lines, light emission of control or indicator lights, acoustic emission of loudspeakers, buzzers, solenoid actuators, vibrators, and the like. The data items of one set are sampled, measured or captured in a close timed relationship with each other. In step 104 classifiers for two or more of the monitored physical properties are received, up to one classifier for each of the monitored physical properties. The classifier targets to classify each of the data items of a set into one of two classes, e.g., normal operation and abnormal operation or intact system integrity and compromised system integrity. Steps 102 and 104 may be executed in reverse order, i.e., the classifiers may be received only once and before the data items are received, and monitoring may include repeated or continuous reception of sets of data items. In step 106 each of the plurality of data items of the received set is classified in accordance with each of the received classifiers, and according probabilities indicating the correctness of the respective classification are provided. In step 108 a combined probability for each set of data items is determined in accordance with the probabilities provided for the correctness of the classifications of each set of the data items by each classifier. The combined probability represents the likelihood of the values of the set of data items belonging to an operation of the monitored digital system falling into one of the two classes. In step 110 a signal is output depending on the value of the combined probability of the set of data items indicating affiliation to a selected one of the two classes. The method may be repeated periodically or continuously, as indicated by the dashed arrow.

Figure 2:
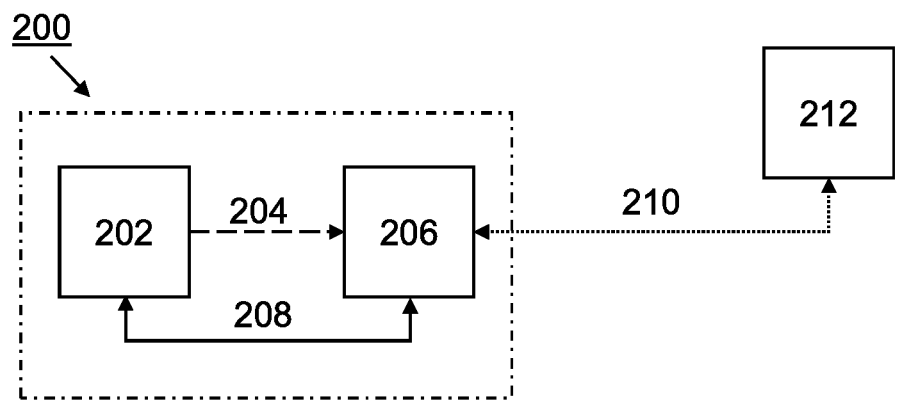
FIG. 2 is a schematic representation of a system implementing the computer-implemented method.

FIG. 2 illustrates an exemplary schematic representation of a system 200 implementing the computer-implemented method 100 of FIG. 1 in accordance with the invention. System 200 includes a component 202 that comprises a power supply, one or more microprocessors and associated volatile and non-volatile memory, one or more interfaces etc. (elements comprised in component 202 are not shown in the figure). The one or more microprocessors of component 202 are configured to, inter alia, provide and execute one or more security functions, e.g., an authorisation of an access to component 202 or for execution of a function provided by component 202. System component 202 may, for example, be an engine control unit (ECU) of a vehicle.

During operation component 202 may transmit and receive communication and other signals through one or more of its interfaces. Component 202 may also incidentally generate and emit other signals not targeted for any recipient, including electromagnetic radiation, heat radiation, varying currents and voltages on its power supply lines, and the like. These other signals are referred to as side-channel signals, indicated by dashed arrow 204.

System 200 further includes a physical execution monitor (PEM) 206 that receives the side-channel signals from system component 202. PEM 206 may be connected with component 202 through a control channel 208 that may be unidirectional or bidirectional. Control channel 208 may serve for selectively activating or invoking PEM 206. PEM 206 may further be connected, via a communication channel 210, to a remote or local server or database 212. Communication channel 210 may be established selectively whenever required and may be disconnected at other times.

Communication channel 210 may serve, e.g., for receiving and updating classifiers or configuration data of PEM 206, or for reporting results of the operation of PEM 206 and the like. PEM 206 may be provided in the system as a separate hardware component, or may be implemented in hardware of system component 202. PEM 206 may even run on a separate processor core of the processor of system component 202, or in a separate, preferably protected process on the same processor core of system component 202. PEM 206 includes computer program instructions that execute method 100 described with reference to FIG. 1.

Figure 3:
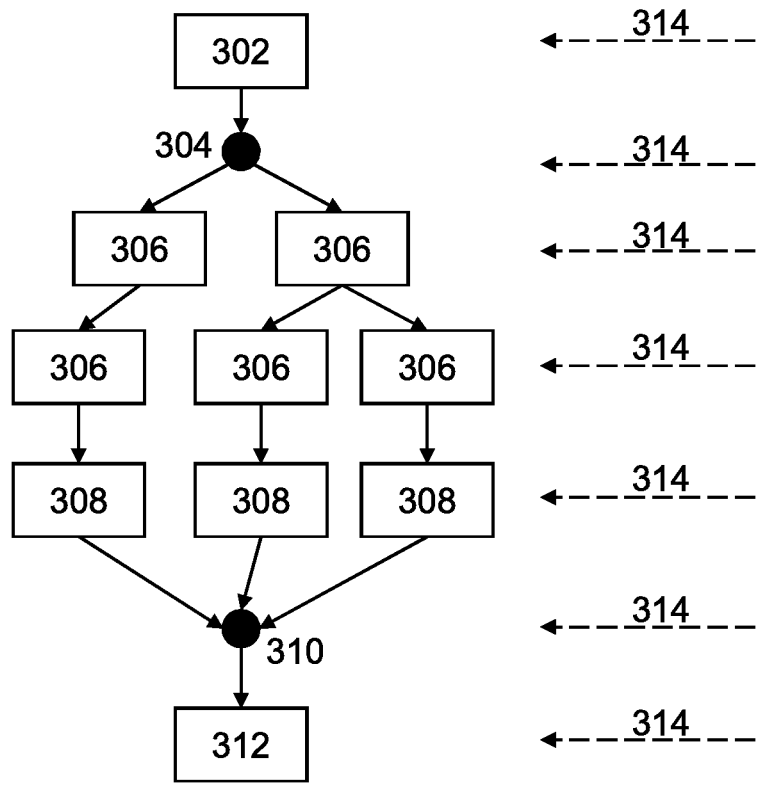
FIG. 3 is an exemplary control flow of a security function.

FIG. 3 shows exemplary reference control flows 300 of software instructions in a microprocessor executing a security function. Box 302 represents input data stored in a memory of the system component that comprises the microprocessor. Input data 302 may also be received from a separate component or through a corresponding user input. Input data 302 is provided to the security process or function at the very beginning thereof, as indicated by the arrow pointing to the filled circle 304. Depending on the input data, the process implementing the security function may validly branch in one of two possible branches. Each branch may have operations to perform, indicated by boxes 306, and may have predetermined further valid branching points during the remaining control flow. Once operations are completed the results, indicated by boxes 308, are available, which represents the termination of the security function, indicated by filled circle 310. The result may be transmitted to further system components and/or stored in a memory, box 312. At each point when an operation is executed, detectable physical properties may be sensed or measured, indicated by dashed arrows 314. For example, access to a memory or transferring data from a memory to a processor may cause typical variations in a current of a power supply of the system, or electromagnetic radiation. Likewise, specific operations or data types may cause similar spikes during processing.

During a training phase using appropriate input data reference values for such physical properties are determined, and typical fingerprints of those measured properties are generated. Each branch taken and each operation performed may have a typical preceding and/or subsequent fingerprint. These fingerprints may be used, individually or as a sequence, for creating templates used for identifying irregularities in the legit flow of operations.

Figure 4:
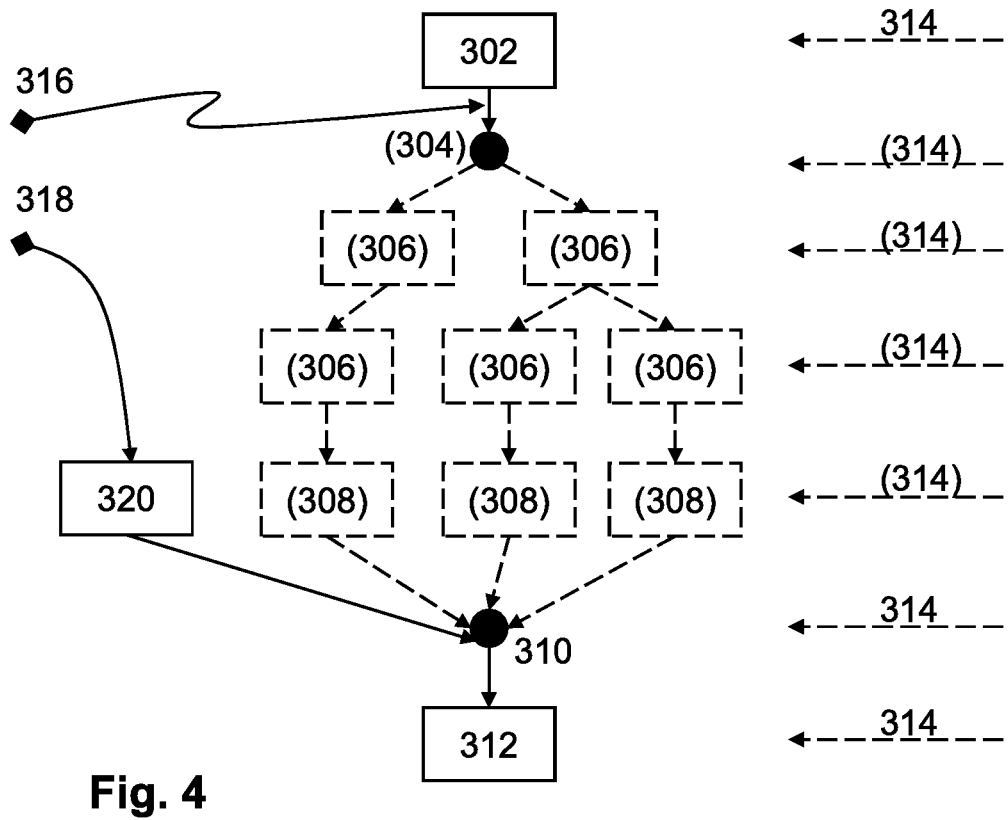
FIG. 4 is an exemplary control flow of a security function under a first type of attack.

During operation the physical properties sensed or measured are taken at the same points in the control flow and may be compared with templates created during the training phase, for identifying irregularities in the legit flow of operations, as will be shown with reference to FIG. 4.

FIG. 4 shows an exemplary control flow of a security function under a first type of attack. The basic flow is identical to the one shown in FIG. 3. However, an attacker prevents activation or invoking security function, or stops it, through a suitable attack, as indicated by arrow 316. This results in the operations 304, 306 that are referenced with reference numerals placed in parentheses not being executed. Accordingly, the physical properties sensed or measured at these points of the control flow may differ significantly from those expected for a normal control flow, as indicated by the reference numerals 314 placed in parentheses. The attacker may then inject, arrow 318, a fake result 320 that is then stored in memory 312. The method presented in this disclosure may be able to detect the differences and to deduce tampering with the security function, which may be used for taking corresponding actions.

Figure 5:
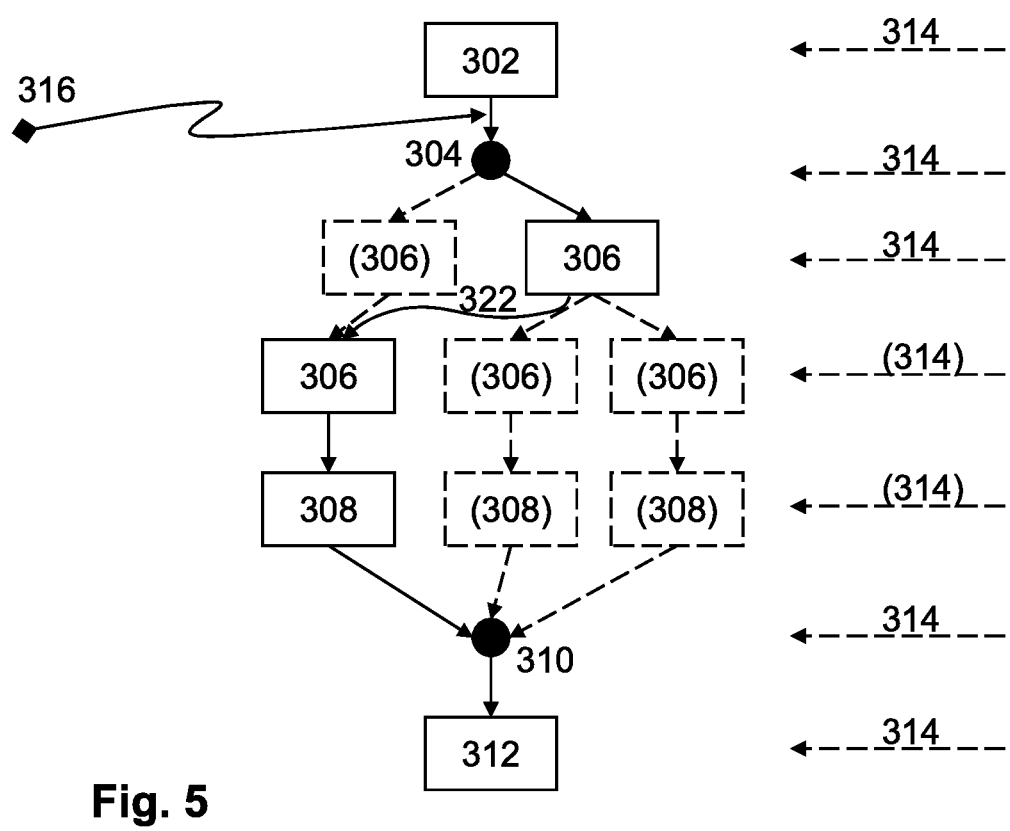
FIG. 5 is exemplary control flow of a security function under a second type of attack.

FIG. 5 shows an exemplary control flow of a security function under a second type of attack. Again, the basic flow is identical to the one shown in FIG. 3. In this attack an attacker manages to change the control flow right at the beginning, indicated by arrow 316, such that an additional branch 322 is present. This may include changing the software, or injecting input data that cause such branch to appear. While the control flow may still exhibit physical characteristics that appear legit in the first three measurement instances, branch 322 will result in physical characteristics that differ from the expected ones at the next two measuring instances. The physical properties in the final measuring instances may again appear normal. Here, too, the method presented in this disclosure may be able to detect the differences and to deduce tampering with the security function, which may be used for taking corresponding actions.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A computer-implemented method of monitoring execution of computer program instructions in a microprocessor of a digital system, comprising:
   a training phase comprising:
      determining input data reference values for physical properties for a training phase;
      generating fingerprints of measured properties; and
      creating templates for identifying irregularities in operations based on the fingerprints;

the monitoring comprising:

receiving a plurality of data items representing real-time measurements of side-channel information emanating from and correlated to the execution of computer program instructions in the monitored digital system, each one of the plurality of data items being sampled in a timed relationship or correlated to each other and forming a value of a corresponding dimension of a side-channel information vector;

receiving, for two or more of the corresponding dimensions of the side-channel information vector, classifiers that assign a received side-channel vector to one of two classes;

classifying the received side-channel information vector in accordance with respective received classifiers, wherein an orthogonal distance of the side-channel information vector from a corresponding classifier indicates an associated probability or confidence value of the respective classification;

generating a combined probability or confidence value for the side-channel information vector from individual classifications and associated probability or confidence values; and outputting a signal if a combined probability or confidence value of a side-channel information vector indicates affiliation to a selected one of the two classes with a predetermined probability.

2. The computer-implemented method of claim 1, wherein generating a combined probability or confidence value for the side-channel information vector comprises:

averaging the individual classifications in a weighted manner that takes the respective probability or confidence value into consideration, or averaging the individual classifications in a weighted manner that takes the respective probability or confidence value into consideration, and further takes an additional weight into consideration that depends on a general reliability, significance or informative value of the respective classifier.

3. The computer-implemented method of claim 1, wherein the monitoring is executed conditional upon at least one of receiving a corresponding trigger signal and upon the digital system executing one or more of a selected number of predetermined functions.

4. The computer-implemented method of claim 3, wherein the corresponding trigger signal is provided by the monitored digital system, by activating or invoking an entity external to the monitored digital system, or generated by a monitoring entity of the system through continuous monitoring of a reduced set of side-channel information.

5. The computer-implemented method of claim 1, further comprising at least one of:

updating or adjusting one or more of the classifiers in a dedicated learning mode, wherein in a learning mode the monitored system is subjected to a plurality of defined operations and corresponding control flows, each of which falling into one of two classes; and updating or adjusting one or more of the classifiers by using side-channel information vectors classified, during operating the system, as indicating an abnormal control flow or compromised system integrity, but which are re-classified as normal control flow or intact system integrity through subsequent additional system and/or user input.

6. The computer-implemented method of claim 1, further including:

storing selected side-channel information vectors for a predetermined time period.

7. The computer-implemented method of claim 1, further comprising:

a self-test phase for a monitoring entity which is entered upon starting the digital system and/or repeatedly entered upon receiving a corresponding signal.

8. A computer-implemented method of claim 7 monitoring execution of computer program instructions in a microprocessor of a digital system, comprising:

receiving a plurality of data items representing real-time measurements of side-channel information emanating from and correlated to the execution of computer program instructions in the monitored digital system, each one of the plurality of data items being sampled in a timed relationship or correlated to each other and forming a value of a corresponding dimension of a side-channel information vector;

receiving, for two or more of the corresponding dimensions of the side-channel information vector, classifiers that assign a received side-channel vector to one of two classes:

classifying the received side-channel information vector in accordance with respective received classifiers, wherein an orthogonal distance of the side-channel information vector from a corresponding classifier indicates an associated probability or confidence value of the respective classification;

generating a combined probability or confidence value for the side-channel information vector from individual classifications and associated probability or confidence values;

outputting a signal if a combined probability or confidence value of a side-channel information vector indicates affiliation to a selected one of the two classes with a predetermined probability; and a self-test phase for a monitoring entity which is entered upon starting the digital system and/or repeatedly entered upon receiving a corresponding signal, wherein the self-test comprises:

executing a first arbitrarily selected function multiple times using static input data, generating corresponding side-channel information vectors and classifying the vectors;

executing a number of other arbitrarily selected functions using static input data, generating corresponding side-channel information vectors and classifying the vectors;

executing the first arbitrarily selected function again, using random input data, generating corresponding side-channel information vectors and classifying the vectors; and generating, from the classifications of the various executions of functions and their associated probability or confidence values, a probabilistic result indicative of whether the first arbitrarily selected function or an input data source thereof is compromised or defective.

9. The computer-implemented method of claim 8, wherein generating the probabilistic result comprises at least one of:

comparing results of multiple executions of the first arbitrarily selected function using static input data with the results of the executions of the other arbitrarily selected functions using static input data and with the results of executions of the first arbitrarily selected function using static input data using random input data; and using the results of the multiple executions as samples in one of:
a statistical hypothesis test,
a Student's t-test,
a test considering the probability distribution of the sample with regard to a reference probability distribution, and
a Kolmogorov-Smirnov test.

10. A digital system comprising one or more microprocessors and associated memory, communication and or user interfaces, sensors and actuators, the system further comprising:
at least one microprocessor configured to:
receive a plurality of data items representing real-time measurements of side-channel information emanating from and correlated to the execution of computer program instructions in the monitored digital system, each one of the plurality of data items being sampled in a timed relationship or correlated to each other and forming a value of a corresponding dimension of a side-channel information vector;
receive, for two or more of the corresponding dimensions of the side-channel information vector, classifiers that assign a received side-channel vector to one of two classes;
classify the received side-channel information vector in accordance with respective received classifiers, wherein an orthogonal distance of the side-channel information vector from a corresponding classifier indicates an associated probability or confidence value of the respective classification;
generate a combined probability or confidence value for the side-channel information vector from individual classifications and associated probability or confidence values; and
output a signal if a combined probability or confidence value of a side-channel information vector indicates affiliation to a selected one of the two classes with a predetermined probability; and
a training phase comprising:
determining input data reference values for physical properties for a training phase;
generating fingerprints of measured properties; and
creating templates for identifying irregularities in operations based on the fingerprints.

11. A vehicle comprising:
a digital system comprising one or more microprocessors and associated memory, communication and or user interfaces, sensors and actuators, the system further comprising:
at least one microprocessor configured to:
receive a plurality of data items representing real-time measurements of side-channel information emanating from and correlated to the execution of computer program instructions in the monitored digital system, each one of the plurality of data items being sampled in a timed relationship or correlated to each other and forming a value of a corresponding dimension of a side-channel information vector;
receive, for two or more of the corresponding dimensions of the side-channel information vector, classifiers that assign a received side-channel vector to one of two classes;
classify the received side-channel information vector in accordance with respective received classifiers, wherein an orthogonal distance of the side-channel information vector from a corresponding classifier indicates an associated probability or confidence value of the respective classification;
generate a combined probability or confidence value for the side-channel information vector from individual classifications and associated probability or confidence values; and
output a signal if a combined probability or confidence value of a side-channel information vector indicates affiliation to a selected one of the two classes with a predetermined probability; and
a training phase comprising:
determining input data reference values for physical properties for a training phase;
generating fingerprints of measured properties; and
creating templates for identifying irregularities in operations based on the fingerprints.

12. A computer program product comprising a non-transitory computer readable storage medium storing instructions which, when the program is executed by a computer, cause the computer to:
train comprising:
determine input data reference values for physical properties for a training phase;
generate fingerprints of measured properties; and
create templates for identifying irregularities in operations based on the fingerprints; and
the monitoring comprising:
receive a plurality of data items representing real-time measurements of side-channel information emanating from and correlated to the execution of computer program instructions in the monitored digital system, each one of the plurality of data items being sampled in a timed relationship or correlated to each other and forming a value of a corresponding dimension of a side-channel information vector;
receive, for two or more of the corresponding dimensions of the side-channel information vector, classifiers that assign a received side-channel vector to one of two classes;
classify the received side-channel information vector in accordance with respective received classifiers, wherein an orthogonal distance of the side-channel information vector from a corresponding classifier indicates an associated probability or confidence value of the respective classification;
generate a combined probability or confidence value for the side-channel information vector from individual classifications and associated probability or confidence values; and
output a signal if a combined probability or confidence value of a side-channel information vector indicates affiliation to a selected one of the two classes with a predetermined probability.

13. A non-transitory computer readable medium computer-readable storage medium storing instructions which, when executed by a computer, cause the computer to:
train comprising:
determine input data reference values for physical properties for a training phase;
generate fingerprints of measured properties; and
create templates for identifying irregularities in operations based on the fingerprints; and
the monitoring comprising:
receive a plurality of data items representing real-time measurements of side-channel information emanating from and correlated to the execution of computer program instructions in the monitored digital system, each one of the plurality of data items being sampled in a timed relationship or correlated to each other and forming a value of a corresponding dimension of a side-channel information vector;

receive, for two or more of the corresponding dimensions of the side-channel information vector, classifiers that assign a received side-channel vector to one of two classes;

classify the received side-channel information vector in accordance with respective received classifiers, wherein an orthogonal distance of the side-channel information vector from a corresponding classifier indicates an associated probability or confidence value of the respective classification;

generate a combined probability or confidence value for the side-channel information vector from individual classifications and associated probability or confidence values; and output a signal if a combined probability or confidence value of a side-channel information vector indicates affiliation to a selected one of the two classes with a predetermined probability.

* * * * *